(12) United States Patent
Grimes

(10) Patent No.: US 11,344,795 B2
(45) Date of Patent: May 31, 2022

(54) TRACKING PLAYING CARDS DURING GAME PLAY USING RFID TAGS

(71) Applicant: The Pokémon Company International, Inc., Bellevue, WA (US)

(72) Inventor: Paul Earl Grimes, Bellevue, WA (US)

(73) Assignee: The Pokémon Company International, Inc., Bellevue, WA (US)

( * ) Notice: Subject to any disclaimer, the term of this patent is extended or adjusted under 35 U.S.C. 154(b) by 0 days.

(21) Appl. No.: 16/839,766

(22) Filed: Apr. 3, 2020

(65) Prior Publication Data

US 2020/0316481 A1 Oct. 8, 2020

Related U.S. Application Data

(60) Provisional application No. 62/829,442, filed on Apr. 4, 2019.

(51) Int. Cl.
| | | |
|---|---|---|
| A63F 13/213 | (2014.01) | |
| A63F 13/86 | (2014.01) | |
| A63F 1/02 | (2006.01) | |
| G06K 7/10 | (2006.01) | |
| A63F 1/00 | (2006.01) | |
| A63F 1/06 | (2006.01) | |
| A63F 9/24 | (2006.01) | |

(52) U.S. Cl.
CPC .............. *A63F 13/213* (2014.09); *A63F 1/00* (2013.01); *A63F 1/02* (2013.01); *A63F 13/86* (2014.09); *G06K 7/10297* (2013.01); *A63F 1/067* (2013.01); *A63F 2009/2489* (2013.01); *A63F 2250/64* (2013.01); *A63F 2300/577* (2013.01); *G06K 2007/10504* (2013.01)

(58) Field of Classification Search
None
See application file for complete search history.

(56) References Cited

U.S. PATENT DOCUMENTS

| | | | | |
|---|---|---|---|---|
| 10,857,450 | B1 * | 12/2020 | Aman | .................... A63F 13/214 |
| 10,930,120 | B1 * | 2/2021 | Ito | ......................... G07F 17/3227 |
| 2002/0147042 | A1 * | 10/2002 | Vuong | ................ G07F 17/3232 |
| | | | | 463/40 |
| 2007/0024449 | A1 | 2/2007 | Bilyeu et al. | |
| 2007/0052167 | A1 | 3/2007 | Galatan | |
| 2009/0170595 | A1 | 7/2009 | Walker | |
| 2010/0234094 | A1 | 9/2010 | Gagner et al. | |
| 2012/0100901 | A1 | 4/2012 | Kirsch | |

(Continued)

*Primary Examiner* — Jason T Yen

(74) *Attorney, Agent, or Firm* — Seed IP Law Group LLP

(57) ABSTRACT

A system having a radio-frequency-identification (RFID) tag reader and a camera to map playing cards to RFID tag values. Each card is inserted into a sleeve that has an RFID tag. During or after insertion of a card into a sleeve, the camera captures an image of the card and the RFID reader captures an RFID tag value for the sleeve. The identity of the card is then determined from the captured image and mapped to the RFID tag value. This mapping information is generated for each card-sleeve pair in a card deck and utilized to track the movement of the cards during game play. The RFID tag value of each card-sleeve pair in the card deck is captured before and after a player draws a card from the deck. The missing RFID tag values are compared to the mapping information to identify which cards where drawn by the player.

16 Claims, 10 Drawing Sheets

(56) References Cited

U.S. PATENT DOCUMENTS

| | | |
|---|---|---|
| 2013/0281173 A1 | 10/2013 | Gilson et al. |
| 2014/0066212 A1 | 3/2014 | French |
| 2017/0232335 A1* | 8/2017 | Williams ................ A63F 13/50 463/31 |
| 2018/0043259 A1* | 2/2018 | Wong ...................... A63F 13/80 |

* cited by examiner

TRACKING PLAYING CARDS DURING GAME PLAY USING RFID TAGS

TECHNICAL FIELD

The present disclosure relates generally to the mapping and tracking of physical playing cards during game play utilizing radio frequency identification tags.

BACKGROUND

Description of the Related Art

Televising poker tournaments, trading card game tournaments, or other card games have grown in popularity over the past few years. During these televised events, players draw, or are dealt, one or more playing cards face down. Commentators for the event can then provide information or discuss different strategies and options available to the players based on the cards in their particular hand, as well as the cards in opposing players' hands. But to provide accurate or real-time information, the commentators need to know what cards are in each player's hand.

Typically, when a player picks up or views his or her cards, they direct the playing face of the cards towards a camera. The commentators can then view captured images of the cards to provide relevant information to the televised audience. The use of cameras also allows the televised audience to view the playing cards as they are viewed by the players. Such cameras can be placed under the playing surface or in an arm rest near each player so as to capture images of the cards when the player lifts the cards to see which cards he or she was dealt. However, cameras have many disadvantages. For example, a player can use his or her hand to completely block the camera from capturing images of the cards. As another example, the camera may capture an image of only a portion of the cards, which, in more complex card games, may not include enough information to allow the commentators to know which cards the player is holding. It is with respect to these and other considerations that the embodiments described herein have been made.

BRIEF SUMMARY

Embodiments are directed towards a system that includes a radio-frequency-identification (RFID) tag reader and a camera to map playing cards to RFID tag values. Each playing card is physically associated with an RFID tag and the camera captures an image of the playing card and the RFID reader captures an RFID tag value from the RFID tag. The identity of the playing card is then determined from the captured image and mapped to the RFID tag value and stored in a memory. This mapping information is generated for each playing card in a deck of cards. As the card deck is being utilized during game play, the RFID tag value associated with each playing card in the card deck is captured before and after a player draws a playing card from the deck. The missing RFID tag values are compared to the mapping information to identify which playing cards were drawn by the player. By capturing RFID tag values for all cards in the deck before and after a playing card is drawn from a deck of cards, the identity of playing cards that have been played or discarded can be known and stored in the memory. In addition, the identity of each card at any one time within a player's hand can be determined without using a camera to capture images of the user's hand itself. This process improves the accuracy in determining the distribution of playing cards during game play and the generation of real-time strategy information related to the game.

In some embodiments, the RFID tag is affixed to a sleeve in which a playing card is inserted. The combined sleeve and card may be referred to as a card-sleeve pair. As the playing card is being inserted into the sleeve, or after the card is inserted into the sleeve, the camera captures images of the playing card and the RFID reader captures RFID tag values from the RFID tag affixed to the sleeve. One or more image processing techniques are performed on the captured image to determine the playing card's identity from the captured image. A mapping between the RFID tag value of the sleeve and the card's identity are stored for each card-sleeve pair, which creates a digital association between the card and the RFID tag. Because the playing cards may be inserted into the RFID tagged sleeves in any order, utilization of the RFID tagged sleeves adds randomness to the mapping between playing cards and RFID tag values, which decreases the likelihood that a player can surreptitiously identify cards from the RFID tags.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
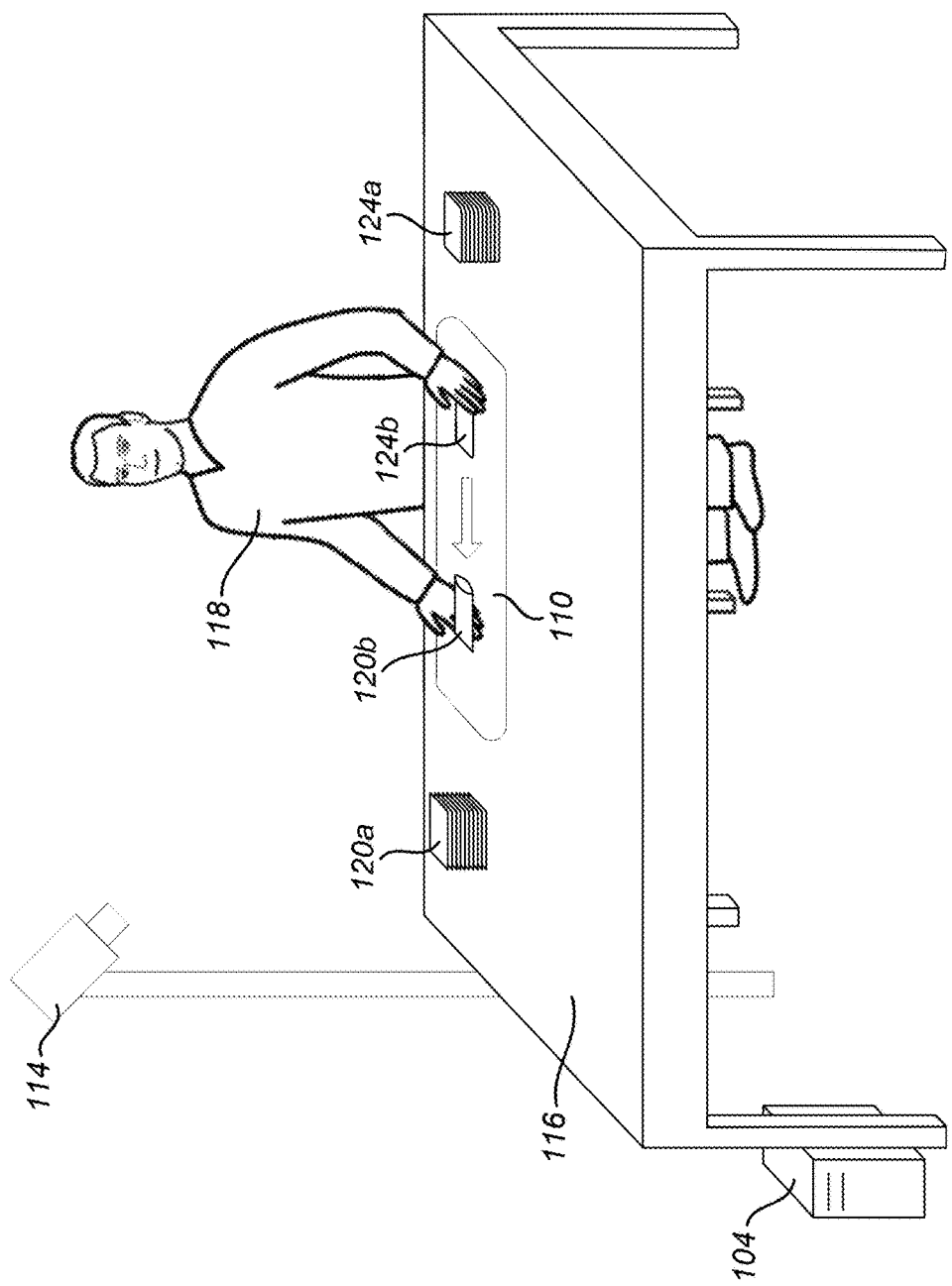
FIGS. 1A-1B illustrate context diagrams of environments where playing cards are paired with sleeves permitting the playing cards to be mapped with RFID tag values associated with the sleeves in accordance with embodiments described herein.
Figure 1B:
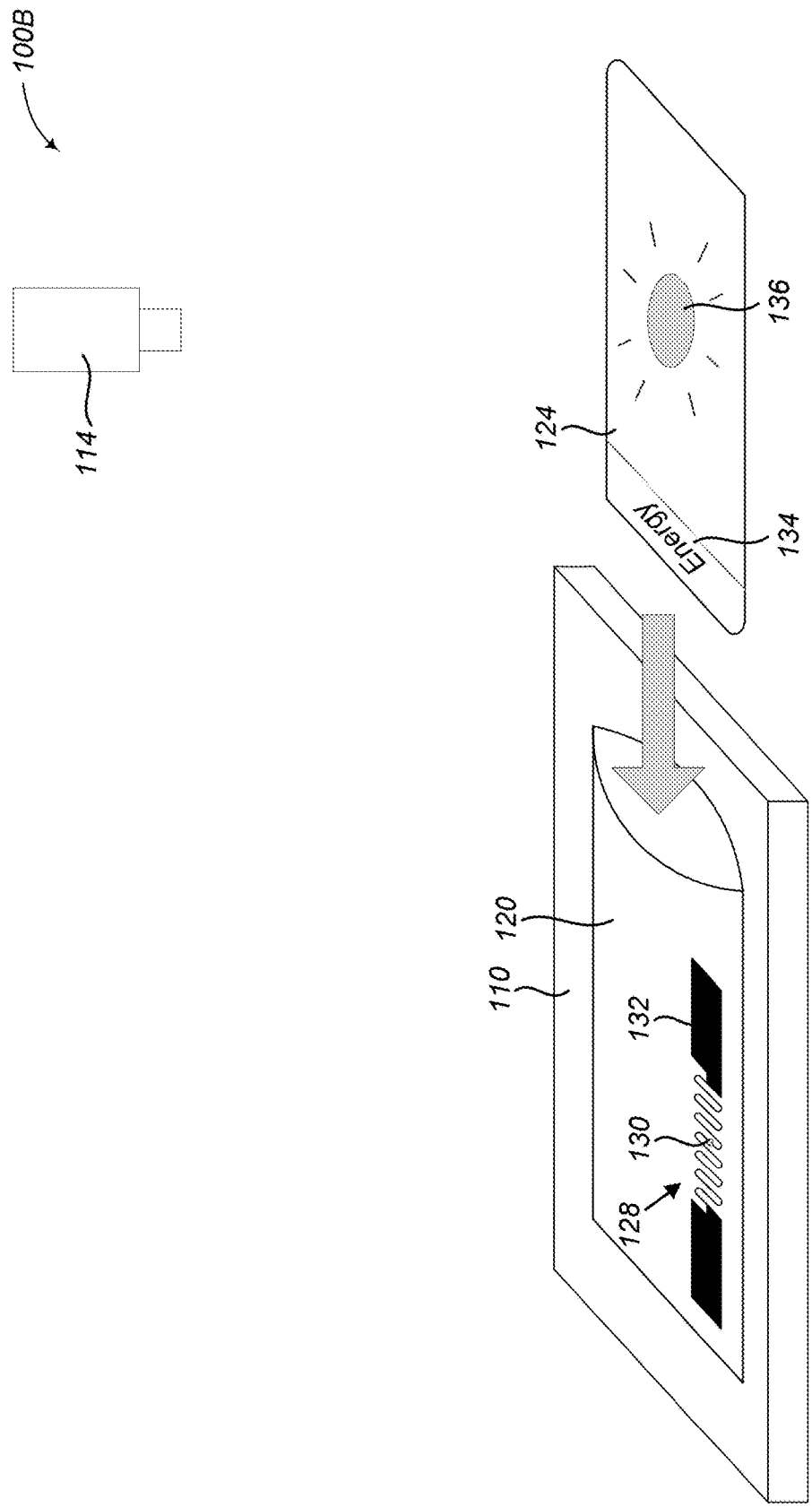

FIGS. 1A-1B illustrate context diagrams of environments that utilize radio-frequency-identification (RFID) tags to track playing cards in accordance with embodiments described herein. FIG. 1A illustrates an environment 100A where a user 118 is inserting playing cards 124 into corresponding sleeves 120. The environment 100A includes a table 116, a computing device 104, a camera 114, and an RFID reader 110. In some embodiments, the RFID reader 110 may be embedded or built into the table 116. In other embodiments, the RFID reader 110 may be positioned on top of the table 116 in front of the user 118.

Briefly, the user 118 removes a playing card 124b from a stack of playing cards 124a and a sleeve 120b from a stack of sleeves 120a. Each sleeve 120 is sized and shaped to fit around a playing card 124. In some embodiments, the sleeve 120 opens at one end to allow the playing card 124 to slide into and be encased in the sleeve 120. In general, the sleeves 120 include a transparent side and an opaque side. The transparent side allows a player to see the playing face of the inserted playing card 124. And the opaque side prevents players from seeing the back side of the inserted playing card 124 (e.g., to hinder a player's ability to view markings or other identifying information on a back side of the playing card that can give away the actual identify of the playing card).

The user 118 inserts the playing card 124b into the sleeve 120b to create a card-sleeve pair. Moreover, each sleeve 120 has an RFID tag (not illustrated) affixed thereto, which is illustrated in FIG. 1B. Each RFID tag is configured to transmit or send a unique RFID tag value in response to receiving an interrogation signal from the RFID reader 110. The RFID tag value may also be referred to as an RFID tag number, RFID tag identifier, or RFID tag ID. The RFID tags allow for each sleeve 120 to be uniquely identifiable from the RFID tag value. In some embodiments, the RFID tag value of the RFID tag affixed to a sleeve may be referred to as the RFID tag value of the sleeve.

As the playing card 124b is being inserted into the sleeve 120b, the camera 114 captures one or more images of the playing card 124b and the RFID reader 110 captures the RFID tag value associated with the sleeve 120b. After capturing the images and RFID tag value, the camera 114 and the RFID reader 110 provide the captured images and RFID tag value to the computing device 104. The computing device 104 employs image recognition techniques on the images to identify the playing card 124b. In various embodiments, the computing device stores an image or identifiable information for each of a plurality of possible playing cards 124. The computing device can then compare the captured image to the stored images such that a match identifies the particular card 124b in the image captured by the camera 114. In some embodiments, the particularly identified card may be referenced by a name, number, or other label.

Once the playing card 124b is identified, its referenced identity (e.g., a card name or identification number) is mapped to the captured RFID tag value of the sleeve 120b. This card-sleeve pair mapping is stored in a table, database, or other data structure. The user 118 can create a card deck containing a plurality of card-sleeve pairs by continuing to insert the playing cards 124 into the sleeves 120. As each corresponding card-sleeve pair is created, the computing device 104 maps the corresponding card's identity to the corresponding sleeve RFID tag value for the corresponding card-sleeve pair using the images captured by the camera 114 and the RFID tag values captured by the RFID reader 110. The mapping information for each card-sleeve pair in a deck of cards may be referred to as the card deck mapping information. One non-limiting example of the mapping or association between playing card 124b and sleeve 120b may be "Tag Value 0x00120423" is associated with card "Blagatortoise EX card 143 from Wind Water set 2" in the deck of player Bob Jones.

In some embodiments, the card-sleeve pair mapping may not be between the identified playing card and the RFID tag value associated with a sleeve, rather the RFID tag value may be modified to be the identity of the playing card. Referring to the example above, the "Tag Value 0x00120423" may be modified or overwritten to be "Bob Jones—Blagatortoise EX card 143 from Wind Water set 2." In this way, the identity of the playing card can be determined from the outputted RFID tag value captured by the RFID reader, rather than accessing a separate mapping database. In some embodiments, the RFID tag of a sleeve may be modified after the playing card is paired with the sleeve and the identity of the playing card determined. In various embodiments, these RFID tags may be rewritable, which allows for the RFID tags to be set to output different RFID tag values based on the playing cards inserted therein. In this way, the RFID tag values are specific to the cards inserted therein, which can change from one card game to another when the sleeves are reused and separate or different playing cards are inserted therein.

FIG. 1B provides additional details of the card-sleeve insertion process. Similar to environment 100A in FIG. 1A, environment 100B includes a camera 114 and an RFID reader 110. As mentioned above, the sleeve 120 includes or has an affixed RFID tag 128. The RFID tag 128 may be affixed to the sleeve 120 by being built into the sleeve 120, stuck onto a portion of the sleeve 120 (e.g., similar to a sticker), or otherwise attached to the sleeve 120. In some embodiments, the RFID tag 128 is affixed to the sleeve 120 during manufacturing of the sleeve 120. In other embodiments, the RFID tag 128 is affixed to the sleeve 120 after manufacturing, such as by the user 118 in FIG. 1A.

The RFID tag 128 includes an antenna 132 and a chip 130. The chip 130 captures, via the antenna 132, interrogation signals transmitted by the RFID reader 110. Once energized, the chip 130 transmits its corresponding RFID tag value via antenna 132, which is captured by the RFID reader 110. In this way, a unique identifier is associated with the sleeve 120 (i.e., the RFID tag value of the RFID tag 128).

The camera 114 captures images of a playing face of the playing card 124. As mentioned above, image processing techniques may be employed on the images to identify the playing card 124. In the illustrated example, the playing card 124 includes a header 134 and a graphic 136. The image recognition process may be configured to analyze the captured image for an outline or shape of the playing card 124, the header 134, the graphic 136, or a combination thereof to identify the playing card 124. It should be recognized that different playing cards have different characteristics. Thus, the image recognition process may be configured to look for text, symbols, logos, icons, graphics, colors, numbers, or other identifying marks on the playing card 124.

In various embodiments, the camera 114 may capture images of the playing card 124 as the playing card 124 is being inserted into the sleeve 120 or after the playing card 124 is fully inserted into the sleeve 120. Likewise, the RFID reader 110 may capture an RFID tag value for the sleeve 120 from the RFID tag 128 as the playing card 124 is being inserted into the sleeve 120 or after the playing card 124 is fully inserted into the sleeve 120. The camera 114 and the RFID reader 110 may be synchronized to capture the respective images and RFID tag value at a same time or within a selected threshold time of one another.

Although FIGS. 1A-1B illustrate the generation of the card-sleeve pairs as being performed by a person, embodiments are not so limited. For example a mechanical device can be utilized to insert the playing card into the sleeve. Such a device may include a mechanism for opening the sleeve, such as blown air, arms that enter the sleeve and then move opposite one another to open the sleeve, or other opening mechanism, and a mechanism for sliding the card into an opened sleeve, such as a sliding arm that pushes the card into the sleeve, positioning of the sleeve and card to allow gravity to pull the card into the sleeve, or other mechanisms. The timing of capturing images of the playing card and capturing RFID tag values associated with a sleeve may be correlated to the mechanical device's insertion of the card into the sleeve. Thus, the use of a mechanical device can automate the process of inserting cards into sleeves, while also increasing the accuracy and timing of the camera capturing images of the card.

Moreover, as mentioned herein, the RFID tag 128 may be rewritable, such that the information transmitted by the RFID tag 128 in response to an interrogation signal is the information that identifies the playing card 124. In at least one such embodiment, the environment 100B may also include an RFID writer (not shown) to modify the RFID tag value associated with the RFID tag 128 after the playing card 124 is identified (e.g., via image recognition techniques employed on images of the playing card 124 captured by camera 114). In yet other embodiments, a user may manually input or select an identity of the playing card 124 via a graphical user interface, which can then be mapped to the RFID tag value or written onto the RFID tag 120.

Figure 2:
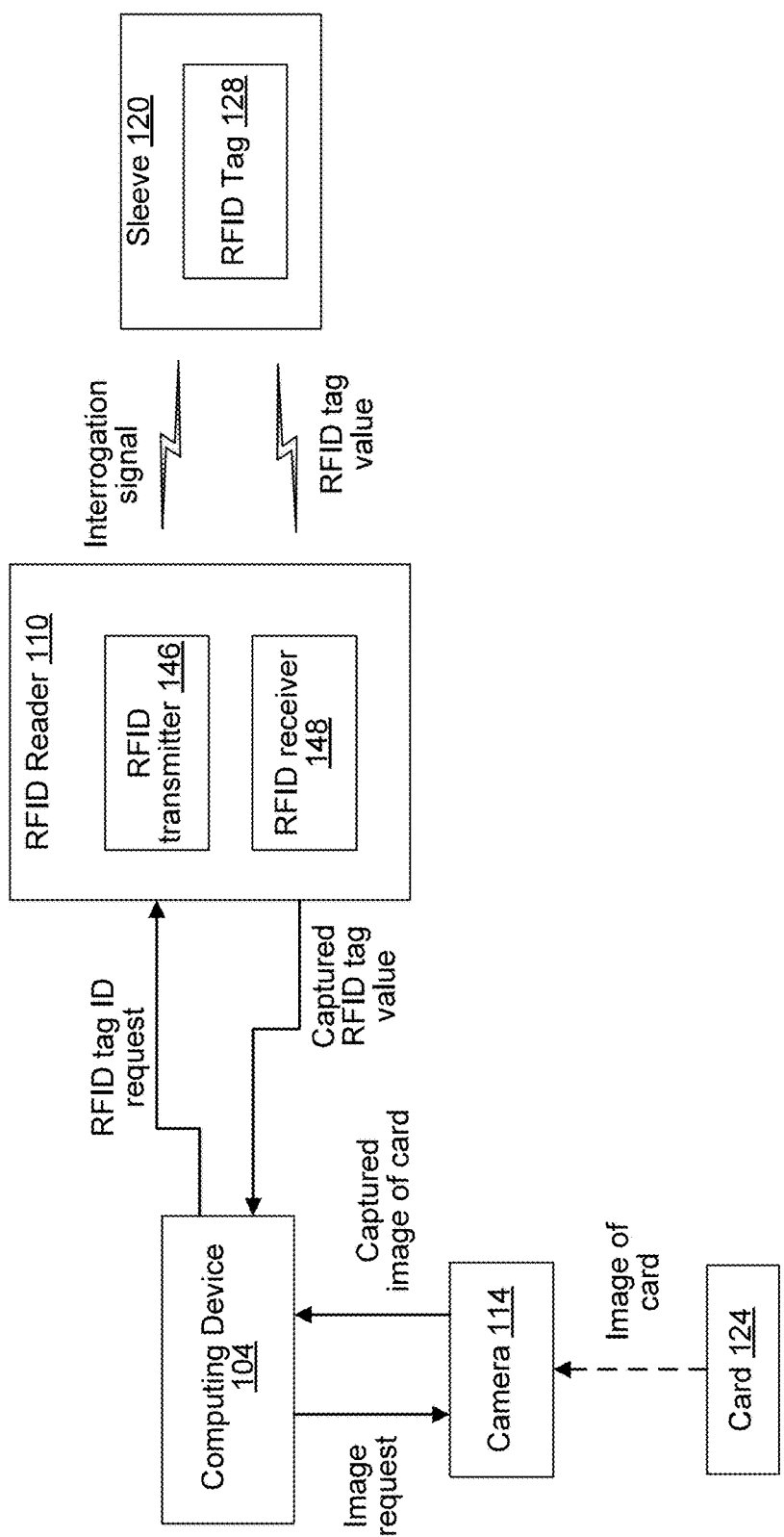
FIG. 2 illustrates a block diagram of the components utilized in tracking playing cards with RFID tags in accordance with embodiments described herein.

FIG. 2 illustrates a block diagram of the components utilized in tracking playing cards with RFID tags in accordance with embodiments described herein. Example 200 includes computing device 104, camera 114, and RFID reader 110. The computing device 104 sends an image request to the camera 114. The camera 114 captures an image of the card 124 based on the request and returns the captured image to the computing device 104. The computing device 104 also sends an RFID tag ID request to the RFID reader 110. The RFID reader 110 includes an RFID transmitter 146, which transmits interrogation signals. An RFID tag 128 on the sleeve 120 receives the interrogation signals and responds with the tag's value or ID. An RFID receiver 148 on the RFID reader 110 receives the RFID tag value from the RFID tag 128. The RFID reader 110 then sends the RFID tag value to the computing device 104. In some embodiments, the image request and the RFID tag ID request includes timing information to synchronize or coordinate the capturing of the image with the capture of the RFID tag value associated with the sleeve 120.

Figure 3:
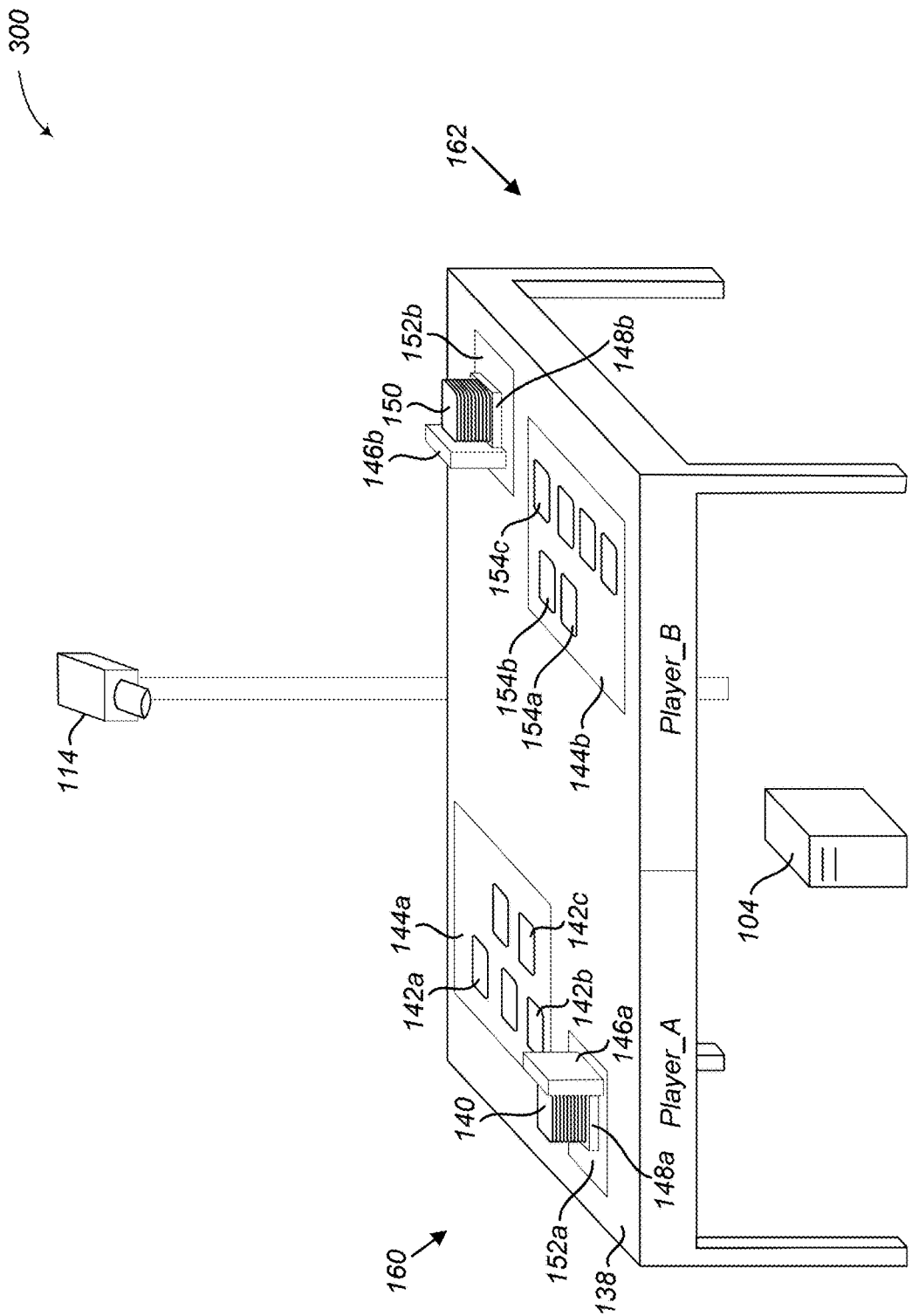
FIG. 3 illustrates a context diagram of an environment in which RFID tag values are utilized to track mapped card-sleeve pairs during the playing of a card game in accordance with embodiments described herein.

FIG. 3 illustrates a context diagram of an environment 300 in which RFID tag values are utilized to track mapped card-sleeve pairs during the playing of a card game in accordance with embodiments described herein. Environment 300 includes a table 138, a camera 114, and a computing device 104. In some embodiments, the camera 114 may be optional and may not be included.

In general, one or more users or players create one or more card decks, each having a plurality of card-sleeve pairs. Each card-sleeve pair may be generated using embodiments described herein to map a card to an RFID tag value of a sleeve of a corresponding card-sleeve pair, such as discussed above in FIGS. 1A-1B and FIG. 2. In this way, each deck of cards includes corresponding card-sleeve pair mapping information, as described herein.

After the card decks are created, the players may engage in playing a card game. In the illustrated example, the card game is played on a table 138. The table 138 is illustrated as having a Player_A side 160 and Player_B side 162.

The Player_A side 160 includes a deal area 152a and a playing area 144a. The deal area 152a is a position on the table 138 in which Player_A maintains his or her draw pile or deck of cards 140 that includes a plurality of card-sleeve pairs (the computing device 104 already having stored thereon the card-sleeve mapping information for each card-sleeve pair in the deck of cards 140).

The deal area 152a includes an RFID transmitter 146a and an RFID receiver 148a. The deck of cards 140 is positioned adjacent to the RFID transmitter 146a and the RFID receiver 148a. In this illustration, the deck of cards 140 is positioned on top of the RFID receiver 148a and next to the RFID transmitter 146a. The positioning of the RFID transmitter 146a is in a vertical arrangement so as to transmit interrogation signals horizontally or orthogonal to the direction in which the deck of cards 140 are stacked. This vertical arrangement improves the propagation of the interrogation signals through the deck of cards 140. In other embodiments, not illustrated, the RFID transmitter 146a and the RFID receiver 148a may be in different positions or configurations from what is shown or they may be integrated into a single housing (not shown).

The playing area 144a is a position on the table 138 in which Player_A places card-sleeve pairs 142a-142c during game play. These card-sleeve pairs 142a-142c are generally referred to as the cards in play, played cards, active cards, or other like terminology depending on the card game being played.

The Player_B side 162 of the table 138 is similar to the Player_A side 160. The Player_B side 161 includes a deal area 152b and a playing area 144b. The deal area 152b is a position on the table 138 in which Player_B maintains his or her draw pile or deck of cards 150 that includes a plurality of card-sleeve pairs, which are distinct from the card-sleeve pairs in the deck of cards 140 for Player_A (the computing device 104 already having stored thereon the card-sleeve mapping information for each card-sleeve pair in the deck of cards 150). The deal area 152b includes an RFID transmitter 146b and an RFID receiver 148b, similar to the Player_A side 160. The deck of cards 150 is positioned adjacent to the RFID transmitter 146b and the RFID receiver 148b. The arrangement and configuration of the RFID transmitter 146b, the RFID receiver 148b, and the deck of cards 150 for the Player_B side 162 may be similar to or different from the arrangement and configuration of the RFID transmitter 146a, the RFID receiver 148a, and the deck of cards 140 for the Player_A side 160. Likewise, the playing area 144b is a position on the table 138 in which Player_B places card-sleeve pairs 154a-154c during game play.

As the card game is being played, players draw playing cards from their deck of cards, play cards in their playing area, and may also discard cards into a discard pile (not illustrated). By implementing embodiments described herein, the computing device 104 can track whether a playing card is in a player's hand, whether it has been played, or whether the card has been discarded.

For example, during Player_A's turn, Player_A picks up the card deck 140, removes a card-sleeve pair from the deck 140 to include in their hand, and returns the card deck 140 to deal area 152a. The RFID transmitter 146a continuously transmit interrogation signals or it may transmit interrogation signals only when the card deck 140 is positioned in the deal area 152a (e.g., adjacent to the RFID transmitter 146a and the RFID receiver 148a). In response to receiving the interrogation signals when the card deck 140 is positioned in the deal area 152a, the RFID tags associated with each card-sleeve pair in the deck of cards 140 transmits is corresponding RFID tag value. A first set of RFID tag values associated with each card-sleeve pair in the deck of cards 140 is obtained by the RFID receiver 148a before Player_A picks up the card deck 140. And a second set of RFID tag values is then obtained after Player_A returns the card deck 140 to the deal area 152a. The computing device 104 compares to first and second sets of RFID tag values. The RFID tag value that is in the first set, but not in the second set, is identified as the card-sleeve pair that was removed from the deck of cards 140 and placed into Player_A's hand. In some embodiments, multiple card-sleeve pairs may be removed from the deck of cards 140, which results in missing multiple RFID tag values. The missing RFID tag values are then compared to the mapping information for the deck of cards 140 to identify which card or cards where drawn by Player_A. The identity of the card can then be provided to an audience, to commentators, or utilized to generate strategy information associated with the game as it is being played.

Player_B can likewise draw one or more card-sleeve pairs from the deck of cards 150. The computing device 104 identifies which card or cards are drawn by Player_B's based on the RFID tag values obtained by the RFID receiver 148b before and after Player_B removes a card-sleeve pair from the deck of cards 150 and the mapping information for the deck of cards 150.

As the card game is being played, Player_A may play a card-sleeve pair 142a into the playing area 144a. The camera 114 captures images of the table 138 as card-sleeve pairs are played into the playing area 144a and provides the images to the computing device 104. The computing device 104 analyzes the captured images to identify which particular cards were played, similar to what is described herein for identifying a card when it is paired with a sleeve. In some embodiments, the playing area 144a may include an RFID reader that is configured to send interrogation signals and receive RFID tag values from RFID tags affixed to the card-sleeve pairs 142a-142c when placed in the playing area 144a. The computing device 104 can then utilize the received RFID tag values to determine which cards were played based on the RFID tag value and the card-sleeve pair mapping information for the deck of cards 140. In at least one such embodiment, camera 114 may be optional and may not be utilized. The identity of the cards being played can then be utilized to modify the strategy information associated with the game as it is being played.

When it is Player_B's turn to play a card, Player_B may do so by placing a card-sleeve pair 154a into the playing area 144b. Card-sleeve pairs 154 placed into the playing area 144b may be identified by capturing images with camera 114 or RFID tag values, similar to what is described with respect to card-sleeve pairs played into the playing area 144a for Player_A.

In some embodiments, the table 138 may include discard pile areas (not illustrated) for Player_A and Player_B. Card-sleeve pairs placed into the discard pile areas may be identified by capturing images with camera 114 or RFID tag values, similar to what is described with respect to card-sleeve pairs played into the playing areas 144a and 144b. In at least one such embodiment, the discard pile areas may include an additional respective RFID reader (not illustrated) specifically for identifying card-sleeve pairs placed into the respective discard pile.

In some embodiments, the playing areas 144a and 144b do not have RFID transmitters and receivers and these are only provided in the respective deal areas 152a and 152b. Similarly, in some embodiments, the deal areas 152a and 152b do not have RFID transmitters and receivers and these are only provided in the respective playing areas 144a and 144b.

Providing the cameras 114 during the game play is optional. Since the identity of the cards is being determined based on the RFID of the card-sleeve pairs during game play, a camera is not used in some embodiments.

Although FIG. 3 illustrates the card game as including two players (Player_A and Player_B) and two decks of cards (140 and 150), embodiments are not so limited. Rather, the number of players, the number of card decks, and the number of card-sleeve pairs in each deck may be different from what is illustrated based on the particular type of card game being played. Likewise, the number and arrangement of cameras and the number and arrangement of RFID readers may differ from what is illustrated depending on the particular type of card game being played, the number of players, the number of card piles or playing areas in which to track the placement or removal of card-sleeve pairs, etc.

Moreover, although FIG. 3 is described as utilizing decks of card-sleeve pairs and their corresponding mapping information, embodiments are not so limited. Rather, in some embodiments, the RFID tags may be affixed to the playing cards themselves, without the use of a sleeve, and each playing card itself has mapping information to its correspondingly affixed RFID tag.

The operation of certain aspects of the disclosure will now be described with respect to FIGS. 4-8. In at least one of various embodiments, processes 400, 500, 600, 700, and 800 described in conjunction with FIGS. 4-8, respectively, may be implemented by or executed on one or more computing devices, such as computing device 104.

Figure 4:
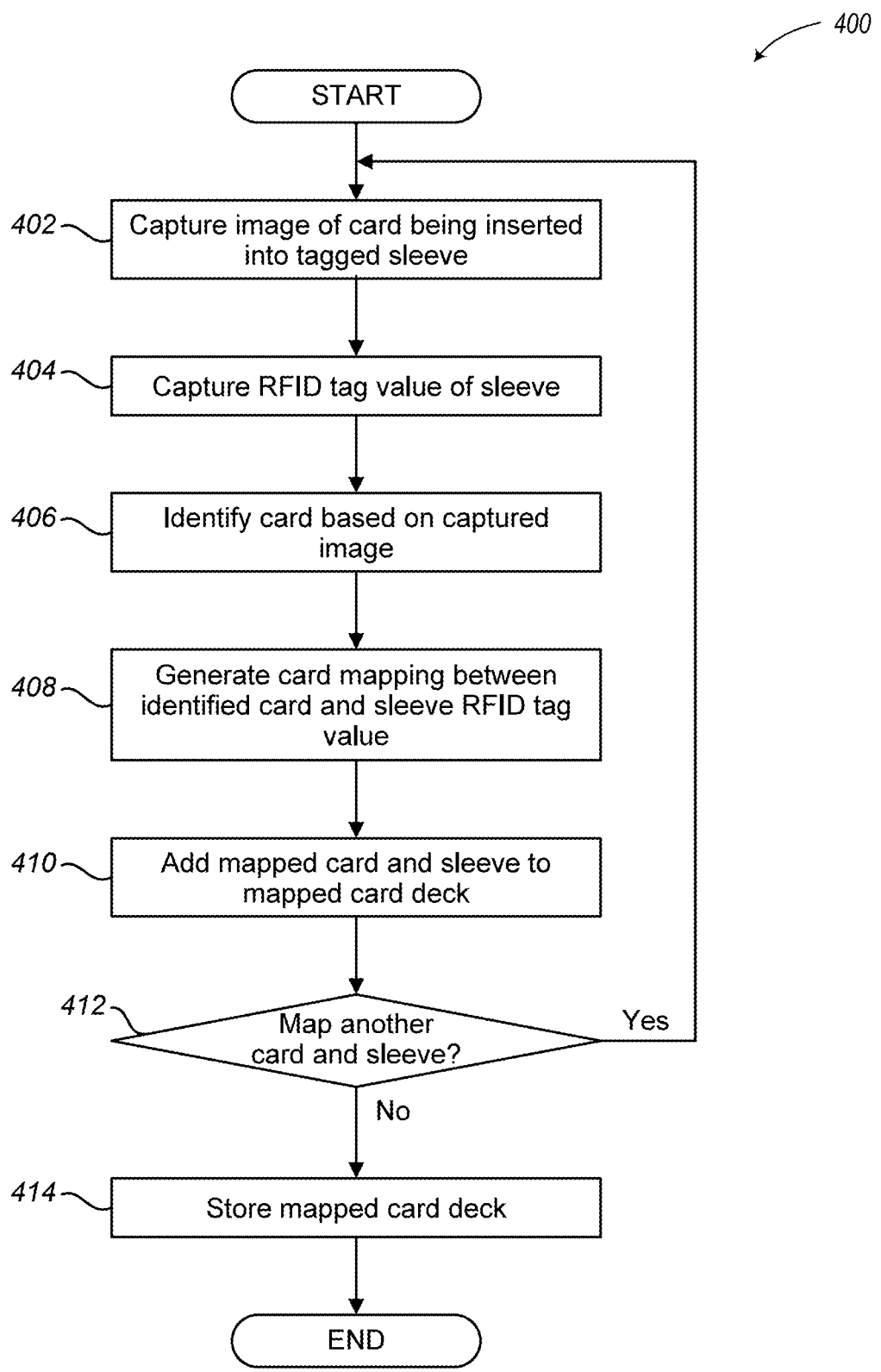
FIG. 4 illustrates a logical flow diagram generally showing one embodiment of a process for mapping playing cards with sleeves that include RFID tags in accordance with embodiments described herein.

FIG. 4 illustrates a logical flow diagram generally showing one embodiment of a process 400 for mapping playing cards with sleeves that include RFID tags in accordance with embodiments described herein.

Process 400 begins, after a start block, at block 402, where one or more images are captured of a playing card being inserted into a tagged sleeve. The images are of the playing face of the playing card, i.e., the informational side of the playing card and not the generic back side of the playing card.

In some embodiments, the images may be captured as a user is or is about to physically insert the playing card into the tagged sleeve or after the playing card has been inserted into the sleeve. In at least one embodiment, a camera may capture images at selected times, at selected time intervals (e.g., every 3 seconds), continuously (e.g., multiple consecutive video frames), or in response to user action or trigger. Examples of such user actions or triggers may include the user pushing a button when the playing card is in the field of view of the camera, the user placing the playing card in a particular position on a table (which can be identified by an inferred sensor or other detection sensor), the camera capturing additional images to detect when the user is inserting a playing card into a sleeve, etc.

Process 400 proceeds to block 404, where an RFID tag value of the sleeve is captured. In various embodiments, an RFID tag reader captures RFID tag vales at selected times, at selected time intervals (e.g., every 3 seconds), continuously, or in response to user action or trigger, similar to the images captured in block 402. In some embodiments, the capturing of the images at block 402 and the capturing of the RFID tag values at block 404 are synchronized to occur at the same time or correlated to occur within some time period of one another. In this way, an RFID tag value from an RFID affixed to the sleeve is captured relative to when an image of a playing card being inserted into the sleeve is captured. In various embodiments, the combination of a card inserted into a sleeve may be referred to as a card-sleeve pair.

Although process 400 illustrates the capturing of the image of the playing card before the captured of the RFID tag value, embodiments are not so limited. And in some embodiments, the capturing of the RFID tag value may be before the capturing of the images of the playing card.

Process 400 continues at block 406, where the playing card is identified based on the captured image from block 402. In some embodiments, a database of images of all possible playing cards may be maintained, such that the captured image can be compared to the images in the database to identify the playing card. In other embodiments, the database may include partial images or instructions on how to identify a playing card from the features or characteristics on the face of the playing card. In various embodiments, one or more image recognition techniques may be employed to identify the playing card. For example, the image can be analyzed for a particular text, symbols, logos, icons, graphics, colors, numbers, or other identifying marks on the playing card. In various embodiments, the playing card may be identified using a trained artificial intelligence model. In some embodiments, the artificial intelligence model may be trained using a database of known playing cards.

Process 400 proceeds next to block 408, where a card mapping between the identified playing card and the sleeve RFID tag value is generated. In some embodiments, this mapping may be generated by storing relationship or association between the playing card and the RFID tag value, such as in a table or other data structure. As mentioned above, the combination of the playing card in the sleeve may be referred to as a card-sleeve pair. Thus, the mapping of a card-sleeve pair includes an RFID tag value of the sleeve and an identity of the playing card (e.g., a name, number, or type of the playing card).

Process 400 continues next to block 410, where the mapped card and sleeve are added to a mapped card deck. In various embodiments, the mapped card deck includes a plurality of mappings between cards and their respective sleeves. Thus, the card deck may include a plurality of card-sleeve pairs, and the mapped card deck may include the mapping information for each of the plurality of card-sleeve pairs.

Process 400 proceeds to decision block 412, where a determination is made whether to map another playing card with another sleeve. In some embodiments, this determination may be based on the number of playing cards, or card-sleeve pairs, in a card deck. For example, some card decks may include 52 cards, while others may include 60 cards, which may depend on the types of playing cards or the card game being played. In other embodiments, this determination may be based on whether additional images, or sensor readings, indicate that the user is inserting another playing card into another sleeve, which may continue until the user stops or inputs a stop command. If another playing card and sleeve are to be mapped together, process 400 returns to block 402 to capture additional images of a next playing card and RFID tag values of a next sleeve (at block 404). Otherwise, process 400 continues to block 414.

At block 414, the mapped card deck is stored. In some embodiments, the mapped card deck is associated with a particular player and stored in a database with other mapped card decks for other players. In other embodiments, a single mapped card deck is utilized for multiple players.

After block 414, process 400 terminates or otherwise returns to a calling process to perform other actions.

Although process 400 is described as mapping a playing card to a sleeve during a single-stage process as the playing card is being inserted into the sleeve, embodiments are not so limited. Rather, in some other embodiments, a two-stage process may be employed. In this process, a plurality of playing cards may be inserted into a plurality of corresponding sleeves to make a plurality of card-sleeve pairs during a first stage. Then each card-sleeve pair can then be positioned such that a camera can capture an image of the playing card in the sleeve and an RFID reader can capture an RFID tag value of an RFID tag affixed to that sleeve during a second stage. This two-stage process may improve efficiency and synchronization because the user does not have to keep the playing card and sleeve in a particular location as the playing card is being inserted into the sleeve. Likewise, a user can manually insert the playing cards into the sleeve, and an automated machine may be used to systematically capture images and RFID tag values of each card-sleeve pair.

Moreover, process 400 is described as mapping a playing card with a sleeve, embodiments are not so limited. Rather, in some embodiments, the playing card may be mapped to an RFID tag value of an RFID tag that is built into, stuck onto, or otherwise affixed to the playing card itself, such as during the manufacturing process or at a later time. In this example, the images captured at block 402 may be of the playing card just prior to, as, or just after an RFID tag is affixed to the playing card. Similar to what is described above, the capturing of the RFID tag value may be synchronized to the image capture. In some embodiments, the capturing of the RFID tag value and the capturing of the images may be some time apart from one another, such as when the affixing is done in an automated assembly line process during manufacturing.

Figure 5:
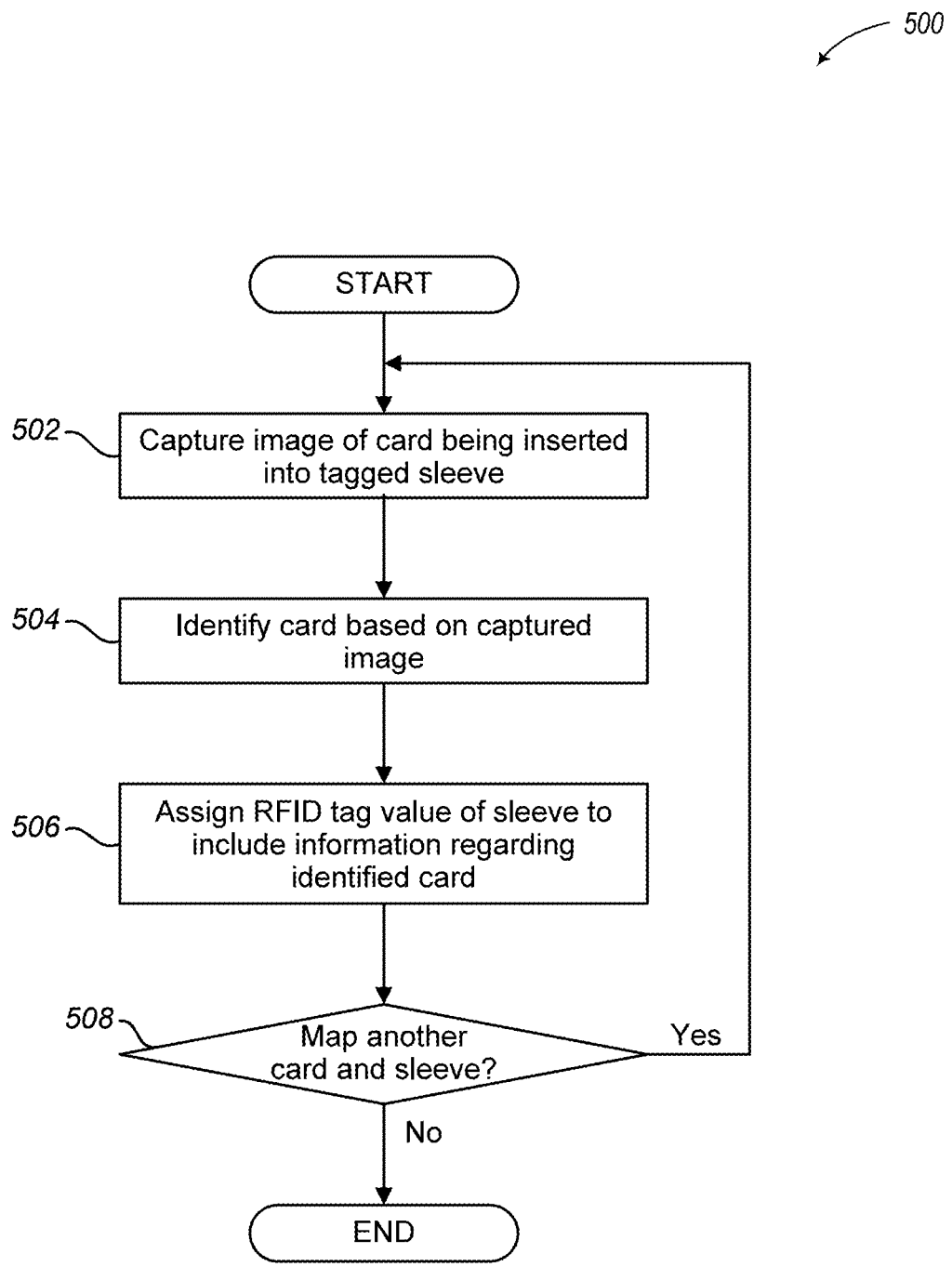
FIG. 5 illustrates a logical flow diagram generally showing one embodiment of an alternative process for mapping playing cards with sleeves that include RFID tags in accordance with embodiments described herein.

FIG. 5 illustrates a logical flow diagram generally showing one embodiment of a process 500 for mapping playing cards with sleeves that include RFID tags in accordance with embodiments described herein.

Process 500 begins, after a start block, at block 502, where one or more images are captured of a playing card being inserted into a tagged sleeve, similar to what is described above in conjunction with block 402 in FIG. 4.

Process 500 proceeds to block 504, where the playing card is identified based on the captured image from block 502, similar to what is described above in conjunction with block 406 in FIG. 4.

Process 500 continues at block 506, where the RFID tag value is assigned with information regarding the identified playing card. In some embodiments, the actual RFID tag identifier is modified to be the card identification information. In other embodiments, the RFID tag identifier is modified to include the card identification information along with the identifier of the RFID tag. In yet other embodiments, a rewritable field associated with the RFID tag is modified to include the card identification information.

The card identification information that is written to the RFID tag is, or includes, the information that the RFID tag is to transmit when responding to an interrogation signal. In this way, the RFID tag of a sleeve responds with the identification of the playing card that is inserted into that sleeve.

Process 500 proceeds next at decision block 508, where a determination is made whether to map another card and sleeve. In various embodiments, this determination may be similar to what is described above in conjunction with decision block 412 in FIG. 4. If another card and sleeve are to be mapped, process 500 flows to block 502; otherwise, process 500 terminates or otherwise returning to a calling process to perform other actions.

Figure 6:
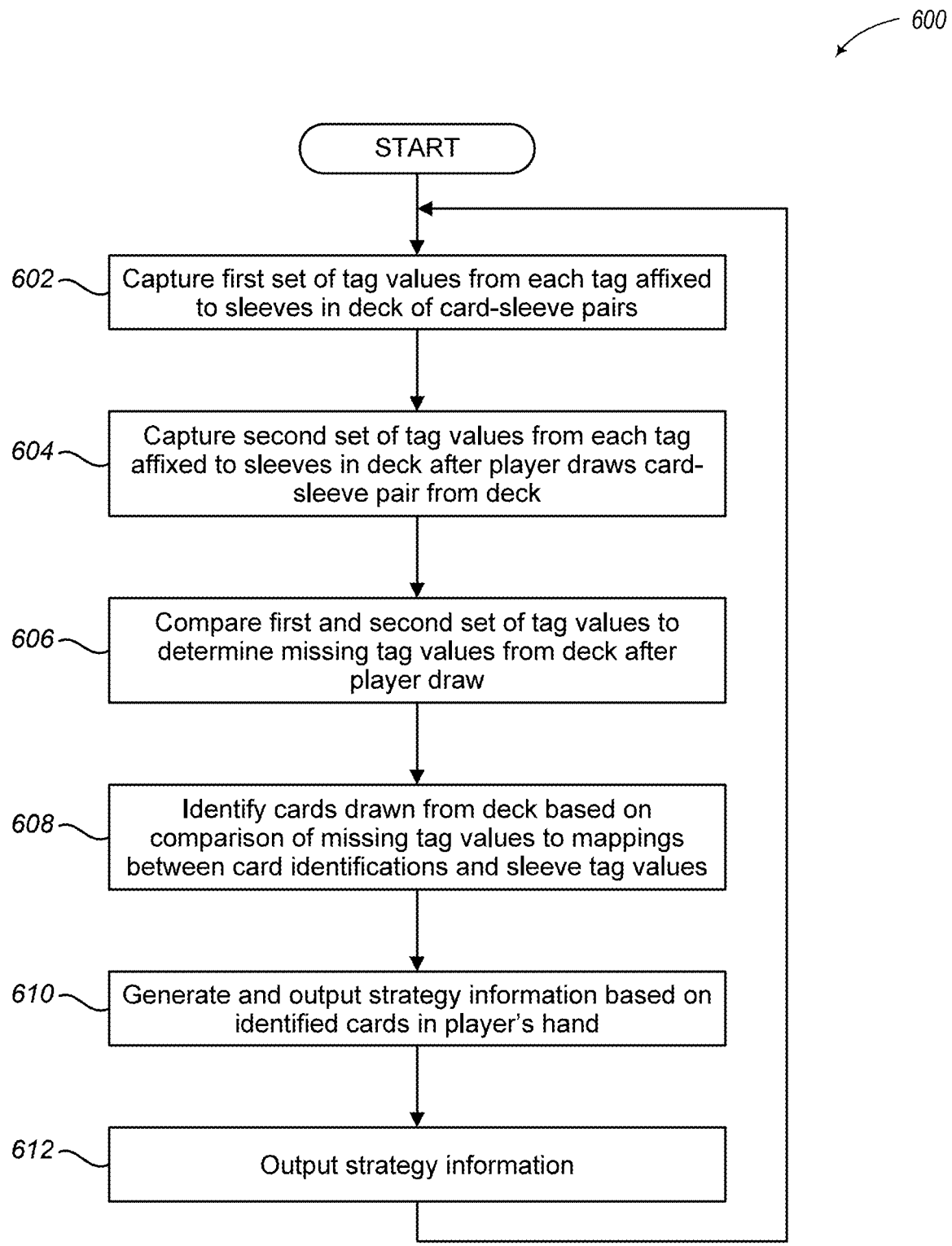
FIG. 6 illustrates a logical flow diagram generally showing one embodiment of a process for utilizing RFID tagged cards to track card movement throughout a card game in accordance with embodiments described herein.

FIG. 6 illustrates a logical flow diagram generally showing one embodiment of a process 600 for utilizing RFID tagged playing cards to track card movement throughout a card game in accordance with embodiments described herein.

Process 600 begins, after a start block, at block 602, where a first set of RFID tag values are captured from each RFID tag affixed to card sleeves in a deck of card-sleeve pairs. In various embodiments, an RFID transmitter sends an interrogation signal through the deck of card-sleeve pairs. The RFID tags affixed to the sleeves of each card-sleeve pair respond to the interrogation signal by sending their corresponding RFID tag value. An RFID receiver captures these returned RFID tag values. The RFID transmitter and the RFID receiver may collectively be referred to as the RFID reader.

As described above, in some embodiments, the RFID transmitter and the RFID receiver may be configured to be in a same housing such that a single RFID reader that is positioned adjacent to the deck of cards (e.g., under the deck of cards) and configured to send interrogation signals and receive RFID tag values. In other embodiments, the RFID transmitter and the RFID receiver may be arranged and configured in two distinct and separate housings. In this way, the RFID transmitter can be in one position adjacent to the deck of cards (e.g., next to a stacked deck of cards) to send interrogation signals through the deck of cards orthogonal to a direction in which the playing cards are stacked and the RFID receiver can be in a different position adjacent to the deck of cards (e.g., under the deck of cards) to receive RFID tag values. The RFID transmitter is adjacent to the deck of cards when the deck of cards is within a threshold distance from the RFID transmitter to have its corresponding RFID tag receive the interrogation signals and respond with an RFID tag value. The RFID receiver is adjacent to the deck of cards when the RFID receiver is within a threshold distance from the deck of cards to receive the RFID tag values send from the corresponding RFID tags in the deck.

Process 600 proceeds to block 604, where a second set of RFID tag values are captured from each RFID tag affixed to card sleeves in a deck of card-sleeve pairs. In various embodiments, block 604 performs embodiments of block 602 to capture RFID tag values, but the second set of tag values are captured after a player has removed one or more card-sleeve pairs from the deck.

In some embodiments, the second set of RFID tag values may be captured in response to the RFID receiver capturing RFID tag values after a selected period of time of not capturing RFID tag values. For example, after the first set of tag values is captured at block 602, the player may pick up the deck to remove a playing card. During this time, the RFID reader may be too far away from the deck in the players hand to energize the RFID tags or capture RFID tag values from the tags in the deck. Once the player replaces the deck adjacent to the RFID reader, the tags can once again receive interrogation signals and respond with RFID tag values, which are again captured by the RFID reader as the second set of RFID tag values.

Process 600 continues at block 606, where the first and second set of tag values are compared to determine which tag values are in the first set of tag values but missing from the second set of tag values. The missing tag values indicate that the corresponding tag is no longer in the deck of cards and thus the corresponding card-sleeve pair for that tag was removed from the deck by the player.

Process 600 proceeds next to block 608, where the cards drawn from the deck are identified based on a comparison of the missing tag values to the card-sleeve pair mappings. As discussed above, the card-sleeve pair mappings correlate which playing card is inserted into which sleeve. Thus, the missing tag values can be compared to the card-sleeve pair mappings to identify the particular playing cards that were removed from the deck and are now in the player's hand.

In some embodiments, a database of card-sleeve pair mappings is accessed to obtain the identity of the playing card based on the corresponding missing tag values, such as where the card-sleeve pair mappings include an association between a playing card's identification and an RFID tag value, as described herein and generated by process 400 in FIG. 4. In other embodiments, the missing tag values include the identity of the missing cards. As described herein, such as in process 500 in FIG. 5, the tag values may be modified or written to include or be the playing card's identification. In at least one such embodiment, a mapping database does not have to be accessed because the tag value received from a RFID tag on a sleeve includes the information that identifies the particular card inserted into that sleeve.

Process 600 continues next to block 610, where strategy information is generated based on the identified playing cards in the player's hand. In various embodiments, the strategy information is generated based on previously identified playing cards in the player's hand, previously identified playing cards in another player's hand, playing cards identified as being played or discarded (e.g., at block 704 in FIG. 7), playing cards still in the deck, or some combination thereof.

The strategy information may include statistical information of the player winning the hand or game, statistical information of which playing card the player is likely to play next, information related to general game strategy based on the combination of the playing cards in the player's hand, etc. In other embodiments, the strategy information may simply include a list of the playing cards in each player's hand.

Process 600 proceeds to block 612, where the strategy information is output to a user. For example, the strategy information may be displayed to a commentator for the commentator to discuss the current status of the game and various strategies and options available to the players. In other embodiments, the strategy information may be overlaid onto a video stream of the players playing the game. In this way, audience members can see what playing cards are in the player's hands, as well as other types of strategy or statistical information.

After block 612, process 600 loops to block 602 to capture another set of RFID tag values and wait for a player to draw another playing card from the deck.

Figure 7:
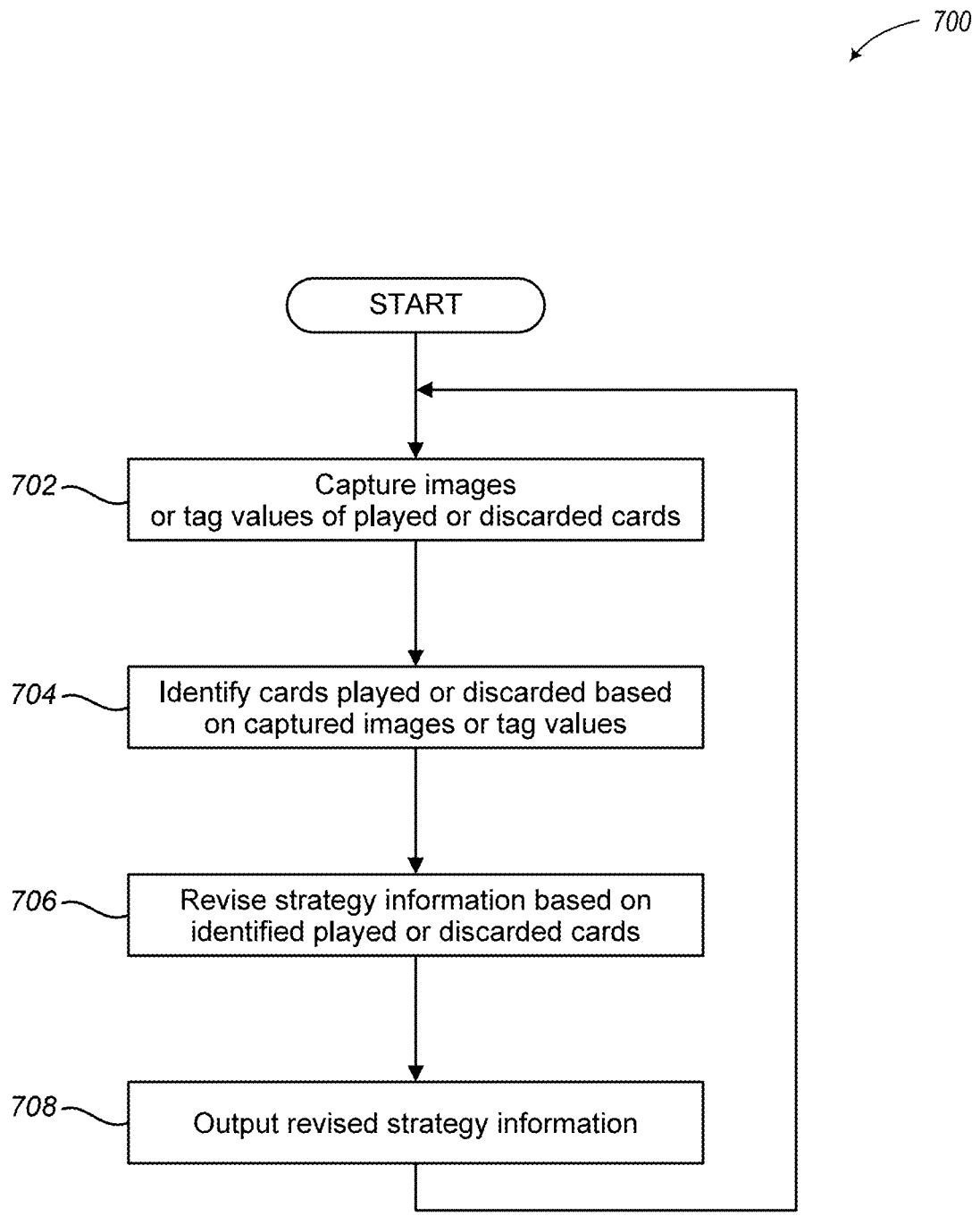
FIG. 7 illustrates a logical flow diagram generally showing another embodiment of a process for utilizing RFID tagged cards to track card movement throughout a card game in accordance with embodiments described herein.

FIG. 7 illustrates a logical flow diagram generally showing another embodiment of a process 700 for utilizing RFID tagged playing cards to track card movement throughout a card game in accordance with embodiments described herein;

Process 700 begins, after a start block, at block 702, where images or RFID tag values are captured of one or more playing cards being played or discarded during the playing of a game. In some embodiments, images or RFID tag values may be captured at selected times, at a selected interval, or in response to a game trigger. For example, an RFID tag reader may be positioned on the table where playing cards are played or discarded. The game trigger may occur when the RFID tag reader for the discard pile or the played card area captures a new RFID tag value. Similarly, a camera may be positioned and configured to captured images of played or discarded cards. The images can be analyzed using image recognition techniques to identify that a playing card was played or discarded.

Process 700 proceeds to block 704, where the played or discarded cards are identified based on the captured images or RFID tag values. In embodiments where the played or discarded card is identified by an image, the image may be analyzed to identify the played or discarded card, similar to block 406 in FIG. 4. In embodiments where the played or discarded card is identified by an RFID tag value, then the card may be identified by comparing the RFID tag value to the card-sleeve pair mappings, similar to block 606 in FIG. 6.

Process 700 continues at block 706, where the strategy information is revised based on the identified cards being played or discarded. In various embodiments, the revised strategy information is generated similar to block 610 in FIG. 6 taking into account the playing cards in each player's hand, the playing cards now played or discarded, the playing cards still in the deck, or some combination thereof.

Process 700 proceeds next to block 708, where the revised strategy information is output to the user, similar to block 610 in FIG. 6.

Figure 8:
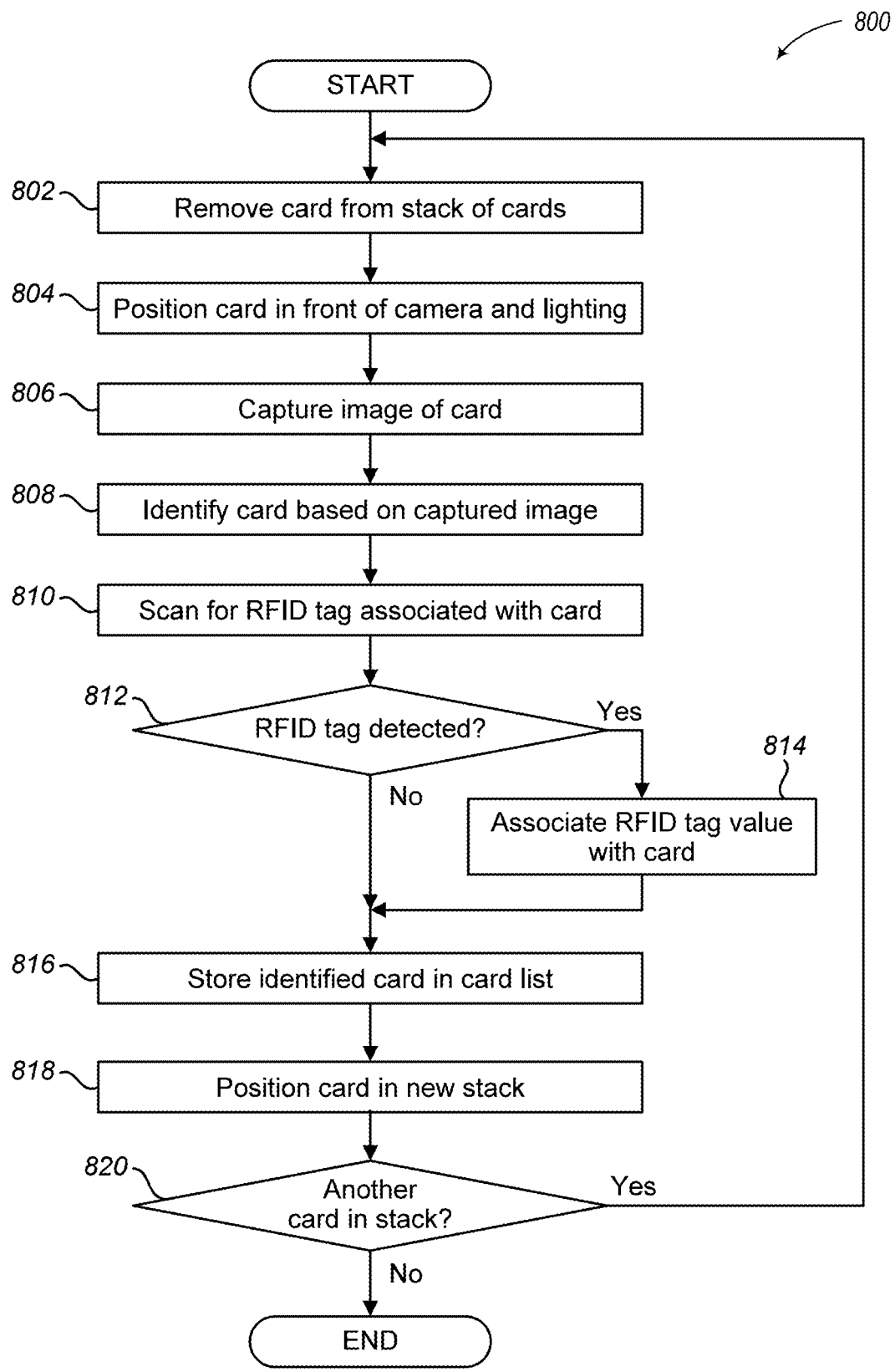
FIG. 8 illustrates a logical flow diagram generally showing one embodiment of a process for generating a list of playing cards in a deck.

After block 708, process 700 loops to block 702 continue to capture images or RFID tag values of cards played or discarded during the playing of the game FIG. 8 illustrates a logical flow diagram generally showing one embodiment of a process 800 for generating a list of playing cards in a deck. In various embodiments, process 800 may be performed by a computing system that includes a camera to capture images of playing cards, a lighting source to illuminate playing cards for image capture, a first mechanism that physically moves playing cards from a stack of cards into a position in front of the camera, a second mechanism that physically moves playing cards from in front of the camera to a new stack, and optionally an RFID reader.

Process 800 begins, after a start block, at block 802, where a playing card is removed from a stack of a plurality of playing cards. In some embodiments, the first mechanism may pick up the playing card from the stack, such as by using a suction mechanism or mechanical fingers. In other embodiments, the first mechanism may swipe the playing card away from the stack, such as to remove the top or bottom playing card of the stack.

Process 800 proceeds to block 804, where the playing card is positioned in front of the camera. In various embodiments, the first mechanism may include an arm, extension member, paddle, wheel, or other mechanical means to move the playing card from the stack location to a position in front of the camera with the face of the playing card directed at the camera. In some embodiments, the first mechanism may continue to hold on to the playing card while positioned in front of the camera. In other embodiments, the first mechanism may release the playing card in front of the camera and return to the stack of playing cards to remove another playing card from the stack.

Process 800 continues at block 806, where an image of the playing card is captured using the camera. The image is of the playing face of the playing card, i.e., the informational side of the playing card and not the generic back side of the playing card. In various embodiments, one or more light sources may be positioned to illuminate the face of the playing card to improve image quality.

In various embodiments, the camera captures the image of the playing card when the first mechanism has positioned the playing card in front of the camera. In some embodiments, one or more sensors may be used to detect if when the playing card is positioned in front of the camera. In other embodiments, the camera may capture the image of the playing card in response to a timing mechanism that is calibrated based on a time from when the first mechanism removes the playing card from the stack of cards to when the playing card is positioned in front of the camera.

Process 800 proceeds to block 808, where the playing card is identified based on the captured image. In various embodiments, block 808 may employ embodiments of block 406 in FIG. 4 to identify the playing card.

Process 800 continues next at block 810, where the computing system utilizes an RFID scanner to scan for an RFID tag associated with the playing card. In some embodiments, the playing card may have already been inserted into a sleeve that includes an RFID tag, as described herein. In other embodiments, the system may include a mechanism that automatically inserts the playing card into a sleeve that includes an RFID tag. In yet other embodiments, the playing card may itself have an RFID tag embedded or attached to it.

Process 800 proceeds next to decision block 812, where a determination is made whether an RFID tag is detected. In various embodiments, an RFID tag is detected if a known or expected tag value is obtain during the scan. If an RFID tag is detected, process 800 flows to block 814; otherwise. Process 800 flows to block 816.

At block 814, the RFID tag value obtained during the scan is associated with the playing card. In various embodiments, block 814 may employ embodiments of block 408 in FIG. 4 to generate a card mapping between the identified card and the RFID tag value. After block 814, process 800 continues at block 816.

In various embodiments, the RFID scanning features of process 800 may be optional and may not be performed. According, block 810, decision block 812, and block 814 may be optional and may not be performed, and process 800 may flow from block 808 to block 816. In at least one such embodiment, the computing system that performs process 800 may not include an RFID reader.

At block 816, the identity of the playing card is stored in a card list. This card list is an aggregated list of all playing cards in the stack of cards that have been identified. In some embodiments, where an RFID tag value is associated with the card, this association or mapping is also stored with the identity of the playing card in the card list, similar to block 410 in FIG. 4.

Process 800 continues next at block 818, where the playing card is positioned in a new stack. In various embodiments, a second mechanism, such as an arm, extension member, paddle, wheel, or other mechanical means, moves the playing card from in front of the camera to a location of the new stack. In at least one embodiment, the second mechanism may pick up the playing card from in front of the camera, such as by using suction or mechanical finders. The second mechanism may then more the playing card to the new stack and release the playing card on the new stack. In some embodiments, when the first mechanism holds the playing card in front of the camera and does not release the playing card, the second mechanism may be the first mechanism, which then moves the playing card to the new stack before releasing the playing card.

Process 800 proceeds to decision block 820, where a determination is made whether there is another playing card in the stack of playing cards. In some embodiments, the stack of playing cards may include a known number of cards, such as 60 or 100. The computing system may maintain a counter for each playing card identified and stop when the counter reaches the known number of playing cards. In other embodiments, a sensor may be utilized to determine when the stack of playing cards is empty.

If there is another playing card in the stack, then process 800 loops to block 802 to remove a next playing card from the stack; otherwise, process 800 terminates or otherwise returns to a calling process. In some embodiments, process 800 may output (not illustrated) the aggregated list of identified playing cards, such as via a display device, printer device, or to another database or computing system. Process 800 can be utilized at card tournaments to create a list of playing cards in each player's deck; utilized by a card shop to identify all playing cards in a player's collection; etc.

It will be appreciated that in some embodiments the functionality provided by the processes discussed above may be provided in alternative ways, such as being split among more processes or consolidated into fewer processes. Similarly, in some embodiments, the illustrated processes may provide more or less functionality than is described. In addition, while various operations may be illustrated as being performed in a particular manner or order (e.g., in serial or in parallel, or synchronous or asynchronous), the operations may be performed in other orders or manners in other embodiments. For example, with respect to process 800 in FIG. 8, an image of a first playing card may be captured at block 806 in parallel with a second playing card being removed from the stack at block 802. Therefore, embodiments of the foregoing processes and methods may contain additional acts not shown in FIGS. 4-8, may not contain all of the acts shown in FIG. 408, may perform acts shown in FIG. 408 in various orders, may combine acts, and may be modified in various respects.

Figure 9:
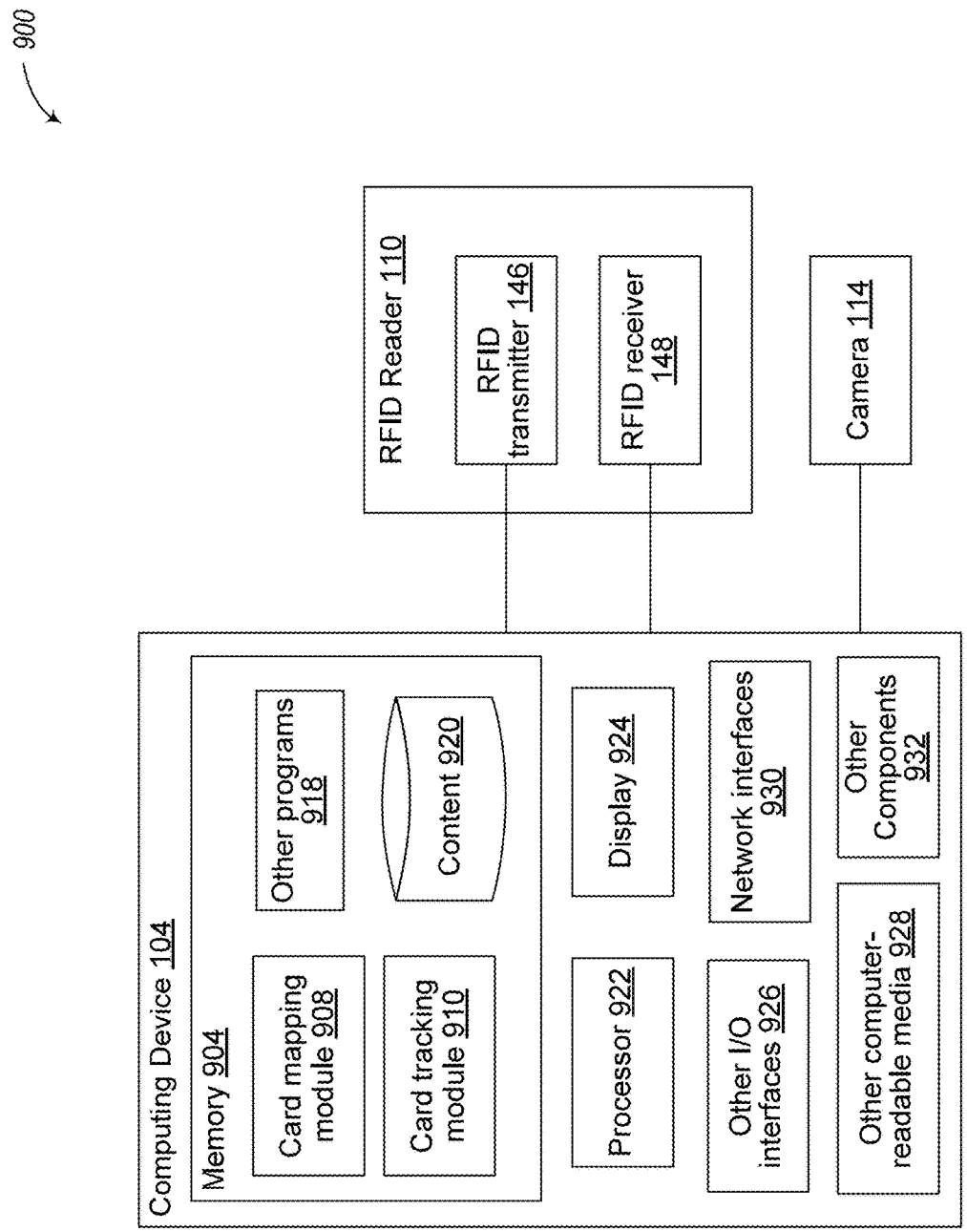
FIG. 9 shows a system diagram that describes one implementation of computing systems for implementing embodiments described herein.

FIG. 9 shows a system diagram that describes one implementation of computing systems for implementing embodiments described herein. System 900 includes computing device 104, RFID reader 110, and camera 114.

As described herein, computing device 104 is a computing device that can perform functionality described herein for receiving image data and RFID tag values to map playing cards and sleeve for each of a plurality card-sleeve pairs (or mapping playing cards to affixed RFID tag values), as well as to monitor the playing of a card game to determine which playing cards have been drawn into a player's hand, played, or otherwise discarded based on the RFID tag values and the corresponding mapping information. Accordingly, various embodiments described herein may be implemented in software, hardware, firmware, or in some combination thereof. The computing device 104 includes memory 904, one or more processors 922, display 924, input/output (I/O) interfaces 926, other computer-readable media 928, network interface 930, and other components 932.

Processor 922 includes one or more processing devices that execute computer instructions to perform actions, including at least some embodiments described herein. In various embodiments, the processor 922 may include one or more central processing units (CPUs), programmable logic, or other processing circuitry.

Memory 904 may include one or more various types of non-volatile and/or volatile storage technologies. Examples of memory 904 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 904 may be utilized to store information, including computer-readable instructions that are utilized by processor 922 to perform actions, including at least some embodiments described herein.

Memory 904 may have stored thereon various modules, such as card mapping module 908 and card tracking module 910. The card mapping module 908 provides functionality to receive images of playing cards from the camera 114 and RFID tag values from the RFID reader 110 and generate a mapping between an identity of the card and the RFID tag value, as described herein. In various embodiments, the card mapping module also includes image processing and analysis functionality to perform image recognition techniques to identify the playing card from the captured images, as described herein. The card tracking module 910 provides functionality to track playing cards during the playing of a card game based on images of playing cards from the camera 114 and RFID tag values from the RFID reader 110, as described herein. In some embodiments, the card tracking module 910 generates statistical information about the playing of the card game based on what cards are in the players' hands, what cards have been played, etc.

Memory 904 may also store other programs 918 and other content 920. Other programs 918 may include operating systems, user applications, or other computer programs. Content 920 may include the mapping information for one or more card-sleeve pairs or one or more card-tag pairs or one or more decks of cards, as described herein.

Display 924 is a display device capable of rendering statistical information to a user, as generated by the card tracking module 910. The display 924 may be a liquid crystal display, light emitting diode, or other type of display device, and may include a touch sensitive screen capable of receiving inputs from a user's hand, stylus, or other object.

I/O interfaces 926 may include interfaces for the RFID reader 110, the camera 114, or various other input or output devices, such as audio interfaces, other video interfaces, USB interfaces, physical buttons, keyboards, or the like. Other computer-readable media 928 may include other types of stationary or removable computer-readable media, such as removable flash drives, external hard drives, or the like.

Network interfaces 930 are configured to communicate with other computing devices via a communication network (not illustrated). For example, in some embodiments, the computing device 104 may communicate with a remote server to have the server perform the image recognition functionality described herein to identify playing cards from images. Network interfaces 930 include transmitters and receivers (not illustrated) to send and receive data via one or more wired or wireless communication networks.

The computing device 104 is also in communication with the RFID reader 110 and the camera 114. The RFID reader 110 includes an RFID transmitter 146 and an RFID receiver 148. The RFID transmitter transmits interrogation signals and the RFID receiver 148 receives RFID tag values sent in response to the interrogation signals, as described herein and utilized by the card mapping module 908 and the card tracking module 910. The camera 114 is configured to capture one or more images of playing cards to be utilized by the card mapping module 908, and in some embodiments the card tracking module 910. Although FIG. 9 illustrates a single RFID reader 110 and a single camera 114, embodiments are not so limited. In some embodiments, the computing device 104 may be in communication with a plurality of RFID readers 110, a plurality of camera 114 or some combination thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a radio-frequency-identification (RFID) tag reader;
   a plurality of playing-card sleeves having RFID tags affixed thereto;
   a plurality of playing cards having one card within each respective sleeve;
   a camera that captures images of a plurality of playing cards; and
   a computing device that includes:
      a memory that stores computing instructions and card deck mapping information for a deck of playing cards that includes a plurality of pairs of a card and a sleeve for that card; and
      a processor that executes the computer instructions to:
         prior to playing a game with the deck of playing cards:
            capture, via the camera, a first image of a first playing card of the plurality of playing cards in association with the first playing card being inserted into a first sleeve of the plurality of playing-card sleeves to make a first card-sleeve pair of the plurality of card-sleeve pairs in the deck of playing cards prior to playing a game;
            capture, via the RFID tag reader, a first radio-frequency-identification-tag value from a first RFID tag affixed to the first sleeve;
            determine an identification of the first playing card based on the first image;
            generate a first mapping for the first card-sleeve pair between the identification of the first playing card and the first radio-frequency-identification-tag value for the first sleeve; and
            store the first mapping in the card deck mapping information in the memory;
         during playing of the game:
            capture, via the RFID tag reader, a first set of RFID tag values from a first set of radio-frequency-identification tags affixed to a first set of card-sleeve pairs from the plurality of card-sleeve pairs in the deck of playing cards;
            capture, via the RFID tag reader after at least one card-sleeve pair is removed from the deck of playing cards, a second set of RFID tag values from a second set of radio-frequency-identification tags affixed to a second set of card-sleeve pairs from the plurality of card-sleeve pairs in the deck of playing cards;
            determine a third set of RFID tag values based on a comparison between the first set and the second set of RFID tag values;
            determine an identification of at least one playing card of the at least one card-sleeve pairs based on the card deck mapping information and the third set of RFID tag values;
            generate strategy information for the game based on the at least one identified playing card;
            capture, via the camera, an image of a playing card that is played or discarded during the game;
            identify the played or discarded card based on the image; and
            modify the strategy information for the game based on the played or discarded card.

2. The system of claim 1, wherein the processor of the computing device further executes the computer instructions prior to playing the game to:
   capture, via the camera, a second image of a second playing card of the plurality of playing cards in association with the second playing card being inserted into a second sleeve of the plurality of playing-card sleeves to make a second card-sleeve pair of the plurality of card-sleeve pairs in the deck of playing cards prior to playing the game;
capture, via the RFID tag reader, a second RFID tag value from a second radio-frequency-identification tag affixed to the second sleeve;
determine an identification of the second playing card based on the second image;
generate a second mapping for the second card-sleeve pair between the identification of the second playing card and the second RFID tag value for the second sleeve; and
store the second mapping in the card deck mapping information in the memory.

3. The system of claim 1, wherein the processor of the computing device further executes the computer instructions during playing of the game to:
capture, via the RFID tag reader, a second RFID tag value of a second playing-card sleeve that is pair with a second playing card that is played or discarded during the game;
identify the second played or discarded card based on the second RFID tag value and the card deck mapping information; and
modify the strategy information for the game based on the second played or discarded card.

4. The system of claim 1, wherein the RFID tag reader includes:
a RFID tag transmitter that is positioned to send interrogation signals through the plurality of card-sleeve pairs in the deck of playing cards orthogonal to a direction in which the plurality of card-sleeve pairs are stacked; and
a RFID tag receiver that is physically separate from the RFID tag transmitter to receive the first and second sets of RFID tag values from a first and second sets of radio-frequency-identification tags affixed to the first and second sets of card-sleeve pairs in the deck of playing cards.

5. The system of claim 4, wherein the RFID tag receiver is positioned under the deck of playing cards in the direction in which the plurality of card-sleeve pairs are stacked.

6. A method, comprising:
inserting a playing card of a plurality of playing cards into a respective sleeve of a plurality of sleeves to create a plurality of card-sleeve pairs in a deck prior to playing a card game;
capturing an image of each respective playing card of the plurality of playing cards in association with the respective card being inserted into the respective sleeve of the plurality of sleeves;
determining an identification of each respective card of the plurality of playing cards based on the image of the respective cards;
modifying an RFID tag value of each respective RFID tag affixed to each respective sleeve in association with the respective card being inserted into the respective sleeve based on the identification of each respective card;
capturing, prior to at least one card-sleeve pair being removed from the deck, a first set of modified RFID tag values of the cards in the deck;
removing at least one card-sleeve pair from the deck;
capturing, after at least one card-sleeve pair is removed from the deck during the playing of the card game, a second set of modified RFID tag values of the cards in the deck; and
determining an identification of at least one card that has been removed from the deck based on at least one modified RFID tag value being in the first set of modified RFID tag values but not in the second set of modified RFID tag values.

7. The method of claim 6, further comprising:
generating strategy information for the game based on the at least one identified playing card.

8. The method of claim 7, further comprising:
capturing a modified RFID tag value of a playing-card sleeve that is paired with a card that is discarded during the playing of the card game;
identifying the discarded card based on the modified RFID tag value; and
modifying the strategy information for the card game based on the discarded card.

9. The method of claim 6, wherein capturing the first and second sets of modified RFID tag values includes:
transmitting, via a RFID tag transmitter, interrogation signals through the plurality of card-sleeve pairs; and
receiving, via a RFID tag receiver that is physically separate from the RFID tag transmitter, the first and second sets of modified RFID tag values from a first and second sets of RFID tags affixed to the first and second sets of card-sleeve pairs.

10. The method of claim 9, wherein the transmitting the interrogation signals includes transmitting the interrogation signals to the plurality of card-sleeve pairs orthogonal to a direction in which the plurality of card-sleeve pairs are positioned during the playing of the card game, and wherein receiving the first and second sets of modified RFID tag values includes receiving the first and second sets of RFID tag values in the direction in which the plurality of card-sleeve pairs are stacked.

11. The method of claim 9, wherein modifying the RFID tag value of each respective RFID tag includes:
setting an output value for each respective RFID tag to include identification information of the respective card inserted into the respective sleeve.

12. A computing device, comprising:
a memory that stores computing instructions and card deck mapping information that maps a respective radio-frequency-identification (RFID) tag value of each of a plurality of radio-frequency-identification tags to an associated playing card of a plurality of playing cards; and
a processor that executes the computer instructions to:
obtain a first set of RFID tag values from a first set of radio-frequency-identification tags of the plurality of radio-frequency-identification tags associated with a first set of cards of the plurality of cards;
obtain a second set of RFID tag values from a second set of radio-frequency-identification tags of the plurality of radio-frequency-identification tags associated with a second set of cards of the plurality of cards in response to at least one card being removed from the first set of cards;
determine a third set of RFID tag values based on a comparison between the first set and the second set of RFID tag values;
determine an identification of at least one card that is associated with the third set of RFID tag values based on the card deck mapping information;
obtain a RFID tag value from a radio-frequency-identification tag associated with a card that is played or discarded during playing of a card game;
identify the played or discarded card based on the RFID tag value and the card deck mapping information; and generate strategy information for the card game based on the played or discarded card.

13. The computing device of claim 12, wherein the processor further executes the computer instructions to:
   obtain a first image of a first card of the plurality of cards in association with the first card being inserted into a first sleeve to make a first card-sleeve pair;
   obtain a first RFID tag value from a first radio-frequency-identification tag affixed to the first sleeve;
   determine an identification of the first playing card based on the first image;
   generate a first mapping for the first card-sleeve pair between the identification of the first card and the first RFID tag value for the first sleeve; and
   store the first mapping in the card deck mapping information in the memory.

14. The computing device of claim 12, wherein the processor further executes the computer instructions to:
   obtain an image of each respective card of a plurality of cards in association with the respective card being inserted into a respective sleeve of a plurality of card sleeves;
   obtain a RFID tag value from each respective radio-frequency-identification tag affixed to each respective sleeve in association with the respective card being inserted into the respective sleeve;
   determine an identification of each respective card of the plurality of cards based on the image of the respective cards; and
   generate the card deck mapping information to include mappings between the identification of each respective card with the RFID tag value of the respective sleeve.

15. The computing device of claim 12, wherein the processor further executes the computer instructions to:
   obtain an image of a second card that is played or discarded during playing of the card game;
   identify the second played or discarded card based on the image; and
   generate strategy information for the card game based on the second played or discarded card.

16. A method, comprising:
   inserting a playing card of a plurality of playing cards into a respective sleeve of a plurality of sleeves to create a plurality of card-sleeve pairs in a deck prior to playing a card game;
   capturing an image of each respective playing card of the plurality of playing cards in association with the respective card being inserted into the respective sleeve of the plurality of sleeves;
   determining an identification of each respective card of the plurality of playing cards based on the image of the respective cards;
   modifying an RFID tag value of each respective RFID tag affixed to each respective sleeve in association with the respective card being inserted into the respective sleeve based on the identification of each respective card;
   capturing, prior to at least one card-sleeve pair being removed from the deck, a first set of modified RFID tag values of the cards in the deck;
   removing at least one card-sleeve pair from the deck;
   capturing, after at least one card-sleeve pair is removed from the deck during the playing of the card game, a second set of modified RFID tag values of the cards in the deck; and
   determining an identification of at least one card that has been removed from the deck based on at least one modified RFID tag value being in the first set of modified RFID tag values but not in the second set of modified RFID tag values;
   generating strategy information for the game based on the at least one identified card;
   capturing a second image of a card that is played during the playing of the card game;
   identifying the played card based on the second image; and
   modifying the strategy information for the card game based on the played card.

\* \* \* \* \*